US012624754B2

(12) United States Patent 
Adriaansen

(10) Patent No.: US 12,624,754 B2 
(45) Date of Patent: May 12, 2026

(54) GEARTRAIN ANTI-BACKLASH LINKAGE

(71) Applicant: Cummins Inc., Columbus, IN (US)

(72) Inventor: Bradley S. Adriaansen, Columbus, IN (US)

(73) Assignee: Cummins Inc., Columbus, IN (US)

( * ) Notice: Subject to any disclaimer, the term of this patent is extended or adjusted under 35 U.S.C. 154(b) by 311 days.

(21) Appl. No.: 18/326,345

(22) Filed: May 31, 2023

(65) Prior Publication Data

US 2023/0304574 A1 Sep. 28, 2023

Related U.S. Application Data

(63) Continuation of application No. PCT/US2021/072026, filed on Oct. 26, 2021.

(60) Provisional application No. 63/120,950, filed on Dec. 3, 2020.

(51) Int. Cl.
*F16H 57/12* (2006.01)
*F16H 1/20* (2006.01)
F16H 57/00 (2012.01)

(52) U.S. Cl.
CPC .............. *F16H 57/12* (2013.01); *F16H 1/20* (2013.01); *F16H 2057/0056* (2013.01); *F16H 2057/125* (2013.01)

(58) Field of Classification Search
CPC .... F16H 57/12; F16H 1/20; F16H 2057/0056; F16H 2057/125; F16H 57/023; F16H 57/0031; F16H 2057/02082
See application file for complete search history.

(56) References Cited

U.S. PATENT DOCUMENTS

| | | | |
|---|---|---|---|
| 3,202,006 A * | 8/1965 | Lewellen, Jr. .......... | F16H 57/12 |
| | | | 74/406 |
| 3,397,589 A | 8/1968 | Moore | |
| 3,502,059 A | 3/1970 | Davis et al. | |
| 5,819,588 A | 10/1998 | Deane et al. | |
| 5,979,259 A | 11/1999 | Shook et al. | |
| 6,247,377 B1 | 6/2001 | Long et al. | |
| 6,293,166 B1 | 9/2001 | Genter et al. | |
| 9,765,876 B2 | 9/2017 | Masafumi et al. | |
| 2004/0089089 A1 | 5/2004 | Stevens et al. | |
| 2013/0047801 A1 | 2/2013 | Ostein et al. | |
| 2014/0360297 A1 * | 12/2014 | Yamauchi ............... | F16H 57/12 |
| | | | 74/409 |

(Continued)

FOREIGN PATENT DOCUMENTS

| | | | |
|---|---|---|---|
| CN | 103277492 A * | 9/2013 | |
| CN | 109237006 A | 1/2019 | |
| DE | 4003042 A1 * | 9/1990 ............. | F16H 57/12 |

(Continued)

OTHER PUBLICATIONS

English Translation of CN103277492 (Year: 2013).*

(Continued)

*Primary Examiner* — Victor L Macarthur
(74) *Attorney, Agent, or Firm* — Taft, Stettinius & Hollister LLP

(57) ABSTRACT

A geartrain assembly includes a first gear, a second gear, and a third gear. A linkage connects the first gear and the second gear, and defines an assembly location of the third gear to connect the third gear to the first and second gears in a manner that minimizes a backlash in the geartrain assembly.

15 Claims, 7 Drawing Sheets

(56) References Cited

U.S. PATENT DOCUMENTS

2015/0276040 A1* 10/2015 Burrell ................. F16H 57/022
74/398

FOREIGN PATENT DOCUMENTS

| EP | 0386645 | A1 | 9/1990 |
| EP | 0544881 | B1 | 1/1997 |
| WO | 2013190458 | A1 | 12/2013 |
| WO | 2015021994 | A1 | 2/2015 |

OTHER PUBLICATIONS

English Translation of DE4003042A1 (Year: 1990).*
International Search Report and Written Opinion, PCTUS202172026
Jan. 28, 2022, 12 pgs.
Extended European Search Report, EP Application No. 21901627,
Dated Sep. 10, 2024, 10 pgs.

* cited by examiner

GEARTRAIN ANTI-BACKLASH LINKAGE

CROSS-REFERENCE TO RELATED APPLICATION

This application is a continuation of International PCT Application No. PCT/US21/72026 filed on Oct. 26, 2021, which claims the benefit of the filing date of, U.S. Provisional Application Ser. No. 63/120,950 filed on Dec. 3, 2020, which is incorporated herein by reference.

TECHNICAL FIELD

The present application relates generally to a geartrain assembly, and more particularly to an anti-backlash linkage for assembly of the geartrain.

BACKGROUND

Geartrain assemblies for internal combustion engines and other applications are well known in the industry and often used for driving cam shafts, balancer shafts, fuel injection pumps and other components. The geartrain assembly may include a start gear, an end gear, and a middle gear positioned between and connecting the start gear and the end gear. In certain installations, such as when spanning a casting joint or in long gear stackups, the location of the middle gear(s) may have to be manually set and therefore may not be precisely controlled relative to the start and end gears. As a result, backlash between the gears can occur which creates noise, vibration, and/or harshness (NVH) issues that must then be attenuated, to the extent possible, by other components, increasing the cost of the assembly.

Therefore, further contributions in this area of technology are needed to improve a geartrain assembly. Therefore, there remains a significant need for the apparatuses, methods and systems disclosed herein.

SUMMARY

An anti-backlash linkage is disclosed that automatically locates, for example, a middle gear between start and end gears. The linkage creates a shorter tolerance stackup loop which allows for fixed mounting methods to be used for mounting the middle gear rather than manually adjustable methods. In one embodiment, the linkage is employed in geartrains that span across multiple engine components that create long tolerance stackup chains, such as when spanning a cylinder block to cylinder head interface. In one embodiment, the linkage remains as a permanent fixture and part of the geartrain assembly after installation. In another embodiment, the linkage is an assembly aide that is removed post-installation of the geartrain assembly.

The linkage provides improved backlash for the geartrain across high-variation joints, such as between the head and block, but is not limited to such applications. The improved backlash reduces NVH, improves engine operation, reduces mechanical noise response from the engine during operation, and provides more consistent NVH from engine to engine.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION OF ILLUSTRATIVE EMBODIMENTS

Figure 1:
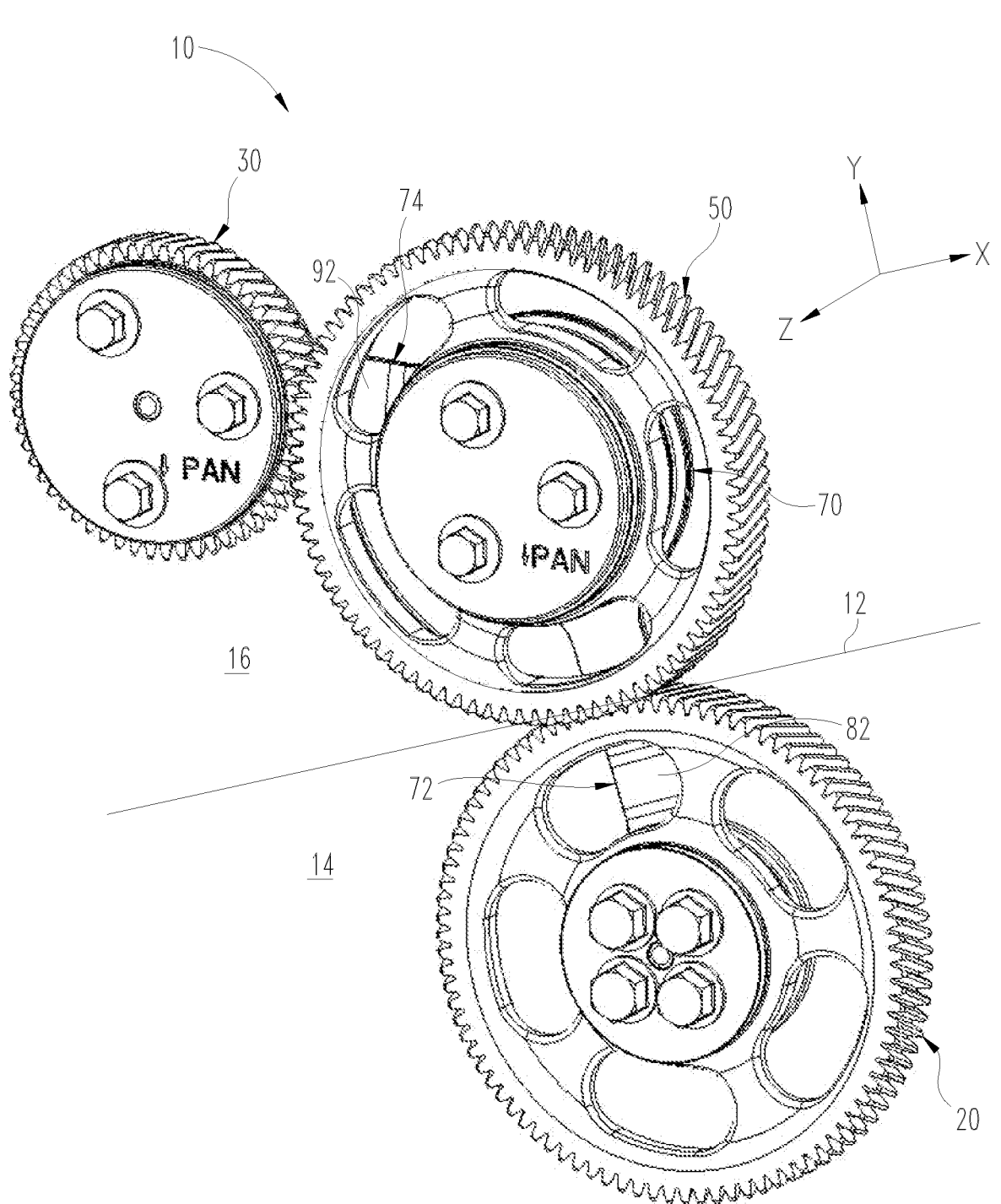
FIG. 1 is a perspective view of a geartrain assembly of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
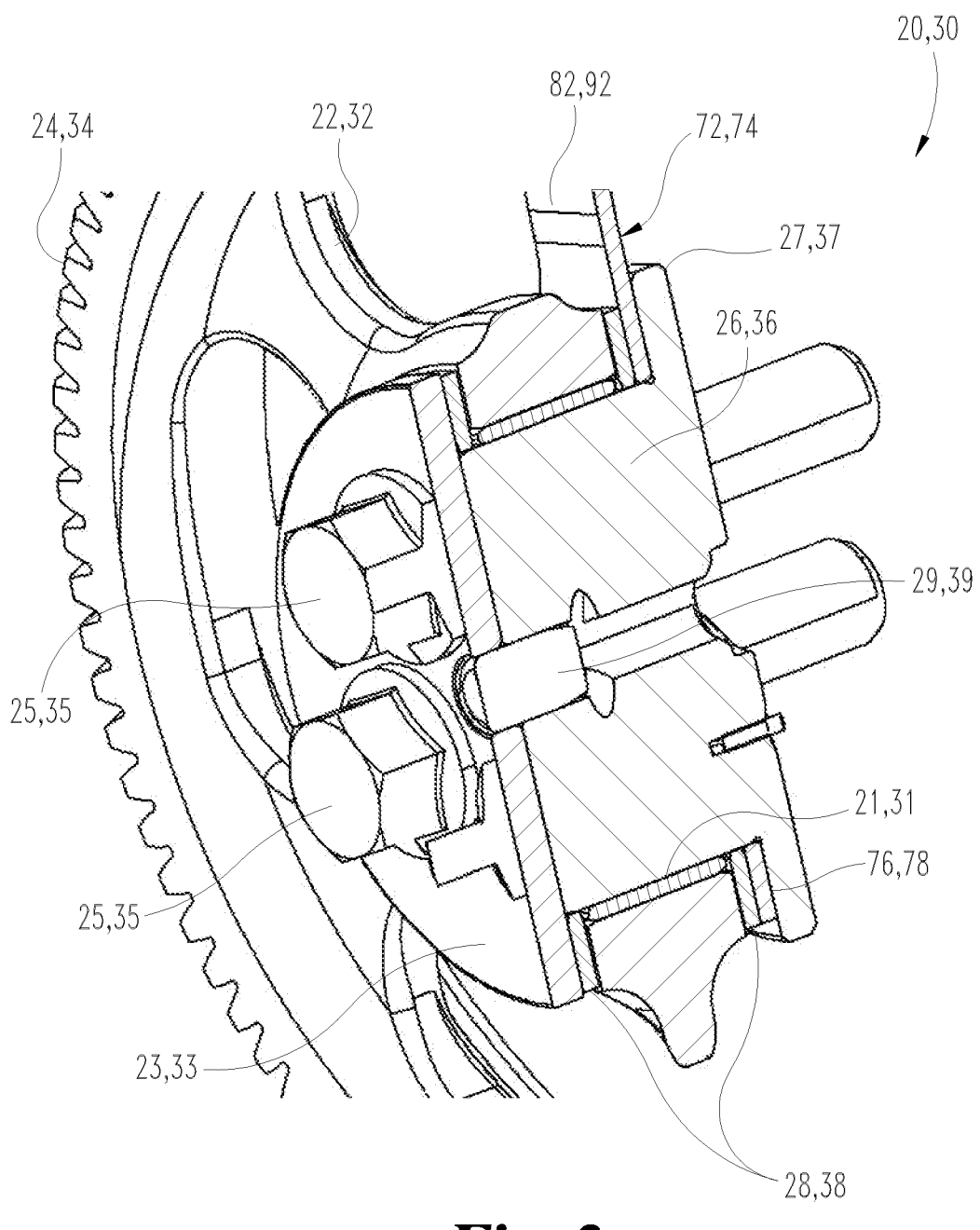
FIG. 2 is a partial sectional view of the start and end gears of the geartrain assembly of FIG. 1.
Figure 3:
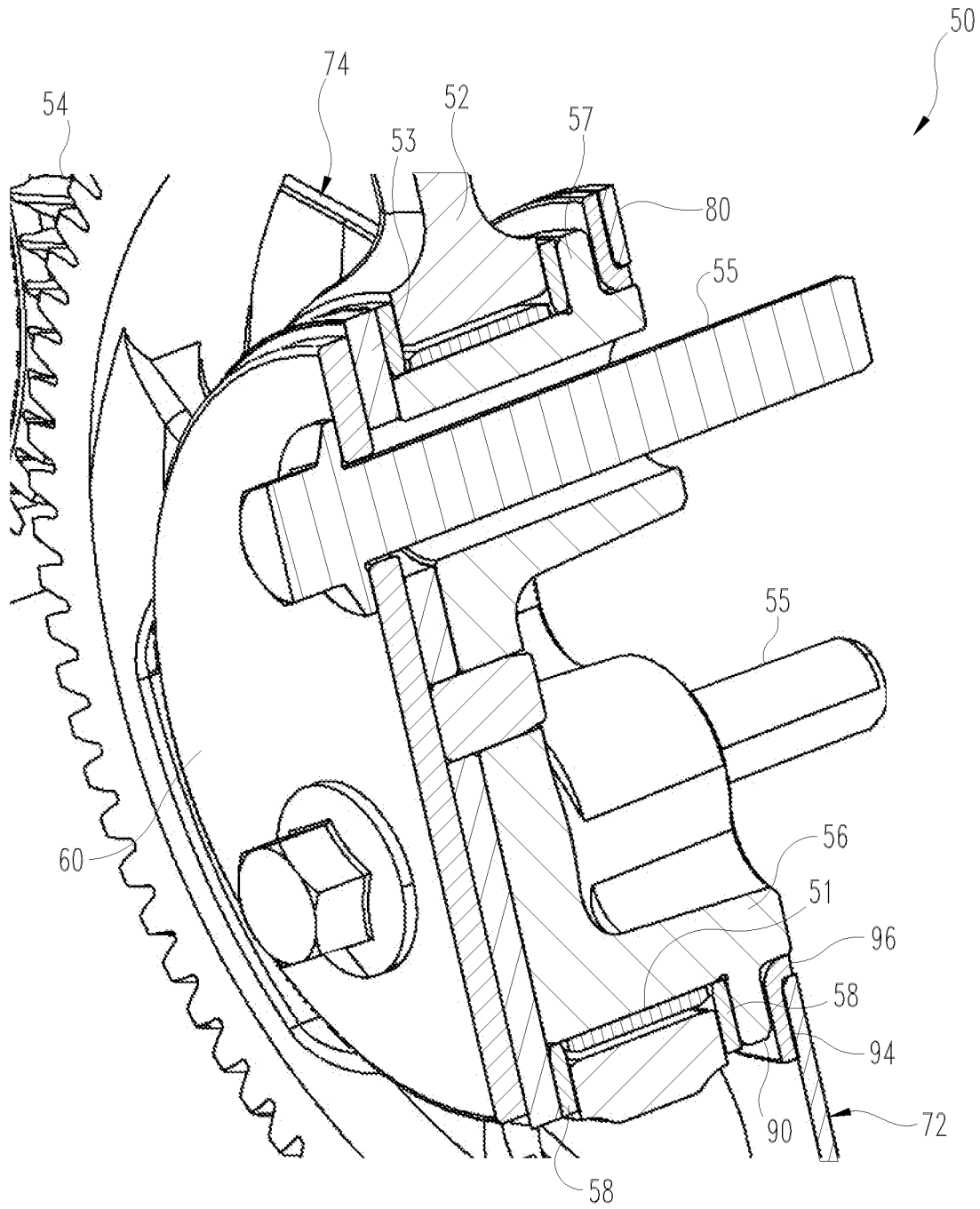
FIG. 3 is a partial sectional view of the middle gear of the geartrain assembly of FIG. 1.

FIGS. 1-3 show a geartrain assembly 10 along with a start or first gear 20, an end or second gear 30, and a middle or third gear 50 that connects the first and second gears 20, 30. In one embodiment, the geartrain assembly 10 span a joint 12, such as a casting joint between a block 14 and a head 16 of an internal combustion engine. However, the present disclosure also has application in gear train assemblies that do not span a casting joint, and in any application in which a chain of gears span a joint, including geartrain assemblies that are not part of an internal combustion engine. The gears 20, 30, 50 can be any type of gear known in the art for internal combustion engines, and each includes a rotatable gear wheel with outer teeth that mesh with the teeth of a connected gear or gears.

A linkage 70 is provided that connects the first gear 20 to the second gear 30, while also defining a mounting location on the engine for the third gear 50 that minimizes or eliminates backlash in the geartrain assembly 10, such as compared to manual procedures for determining the mounting location. In one embodiment, the linkage 70 includes a first link member 72 engaged to and extending radially outwardly from first gear 20, and a second link member 74 engaged to and extending radially outwardly from second gear 30. The location at which the outer ends of first and second link members 72, 74 interfit or interlock with one another defines the mounting location of third gear 50 on, for example, head 16. It should be understood that the mounting location for third gear 50 could also be on block 14, or other component. Mounting third gear 50 at the defined mounting location connects third gear 50 to each of the first and second gears 20, 30 with reduced or minimized backlash.

Referring to FIG. 2, first gear 20 and/or second gear 30 each includes an idler shaft 26, 36 about which the gear wheel 22, 32 with teeth 24, 34 rotate, respectively. A bushing or journal 21, 31 may be provided between the idler shaft 26, 36 and the respective gear wheel 22, 32. A retainer 23, 33 in the form of a plate can be mounted to idler shaft 26, 36 with fasteners 25, 35 to axially retain the gear wheel 22, 32 on the respective idler shaft 26, 36. Fasteners 25, 35 extend through retainer 23, 33 and idler shaft 26, 36 to mount the idler shaft 26, 26 to, for example, block 14 or head 16. Thrust bearings 28, 38 may also be provided between retainer 23, 33 and the respective gear wheel 22, 32; and/or between gear wheel 22, 32 and the respective first or second link member 72, 74 mounted to idler shaft 26, 36. However, thrust bearings 28, 38 can be omitted in other embodiments.

In addition, first link member 72 includes a first circular flange 76 at one end thereof that is positioned around idler shaft 26 to secure first link member 72 to first gear 20. A first link arm 82 extends outwardly from first circular flange 76. Second link member 74 includes a second circular flange 78 at one end thereof that is positioned around idler shaft 36 to secure second link member 74 to second gear 30. A second link arm 92 extends outwardly from second circular flange 78. Idler shaft 26, 36 includes a radially extending lip 27, 37 opposite of retainer 23, 33. Flange 76, 78 is positioned between lip 27, 37 and gear wheel 22, 32.

Referring to FIG. 3, third gear 50 includes an idler shaft 56 about which the gear wheel 52 with teeth 54 rotates. A bushing or journal 51 may be provided between the idler shaft 56 and the respective gear wheel 52. A retainer 53 in the form of a plate can be mounted to idler shaft 56 with fasteners 55 to axially retain the gear wheel 52 on the idler shaft 56. Fasteners 55 extend through a load distribution plate 60, retainer 53 and idler shaft 56 to mount the idler shaft 56 to, for example, block 14 or head 16. Thrust bearings 58 may also be provided between retainer 53 and the gear wheel 52; and/or between gear wheel 52 and the engagement of first and second link members 72, 74 to idler shaft 56. However, thrust bearings 58 can be omitted in other embodiments.

First link member 72 includes a first locating member 80 at the end thereof opposite of first circular flange 76. Second link member 74 includes a second locating member 90 at the end thereof opposite the second circular flange 78. The first and second locating members 80, 90 are interlocked with one another to define the mounting location for third gear 50. In one embodiment, each of the first and second locating members 80, 90 include a ring-shaped plate. In addition, one of the locating members 80, 90, such as the second locating member 90, includes a leg 96 extending or projecting transversely from the inner diameter of the plate portion 94 thereof. Leg 96 is captured in the ring-shaped plate of first locating member 80 at a predefined location in which the link members 72, 74 intersect one another. Idler shaft 56 includes a lip 57 that is positioned against the interlocked locating members 80, 90 as the idler shaft 56 is guided to the mounting location on the engine through the inner passage defined by leg 96.

Figure 4:
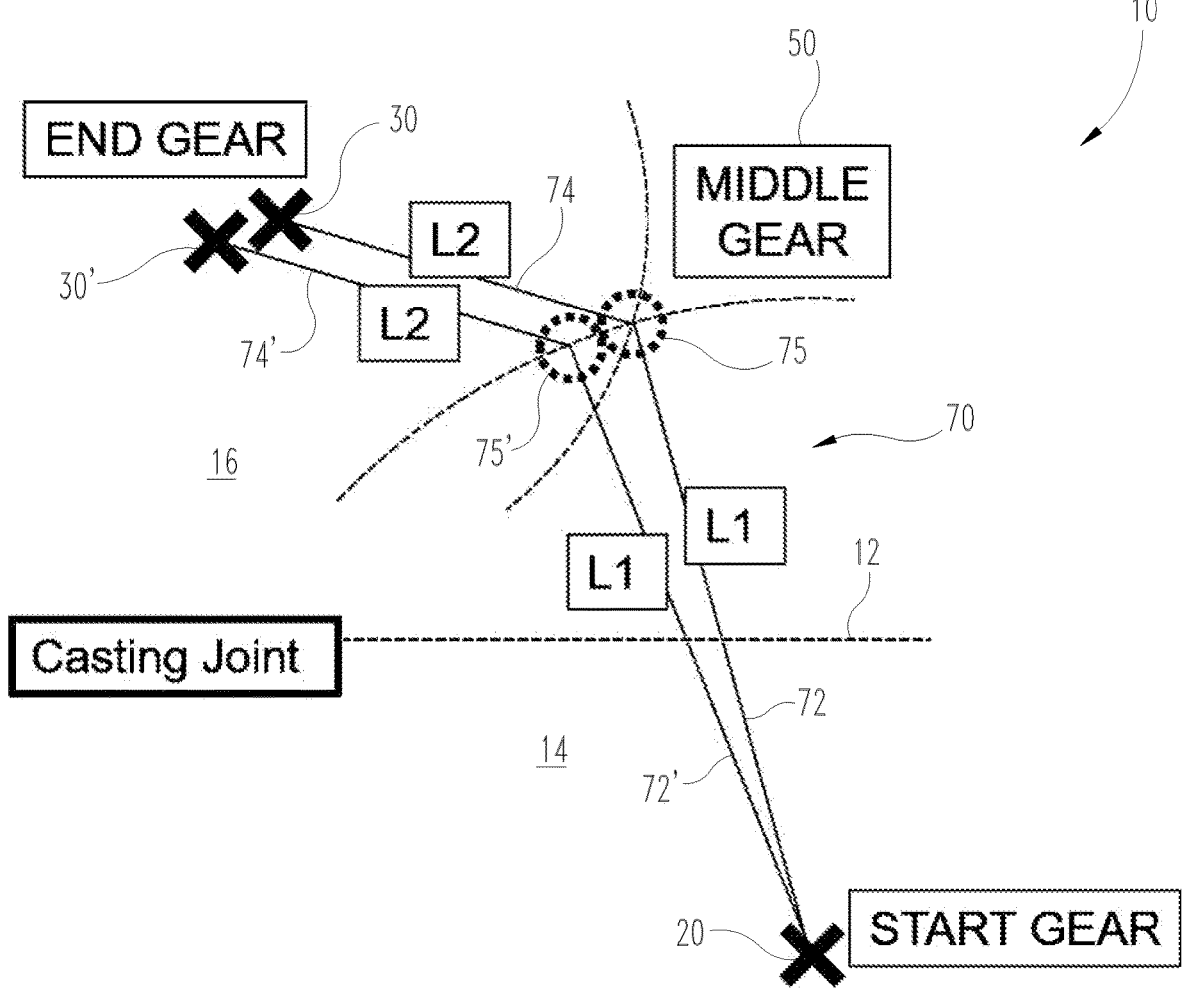
FIG. 4 is a diagram showing how the linkage can be used to precisely locate the middle gear during installation of the geartrain assembly.

Referring to FIG. 4, a diagram is shown in which linkage 70 defines a mounting location 75 for third gear 50 at an engagement location of the link members 72, 74 from first and second gears 20, 30. For example, in a first engagement arrangement, the fixed lengths L1 and L2 of link members 72, 74 define a mounting location 75 on head 16 at an intersection of the link members 72, 74. In a second arrangement, such as in the case of head 16 being replaced on block 14 so the second gear 30 has a different mounting location 30′ relative to first gear 20, the desired mounting location of third gear 50 is moved relative to mounting location 75′ from the first mounting location 75 due to tolerance changes between the components. The fixed lengths L1 and L2 of moved link members 72′, 74′ extending from first gear 20 and second gear 30′ intersect to define the new mounting location 75′ due to a fixed relationship between the link members 72, 74 of the linkage 70.

Figure 5A:
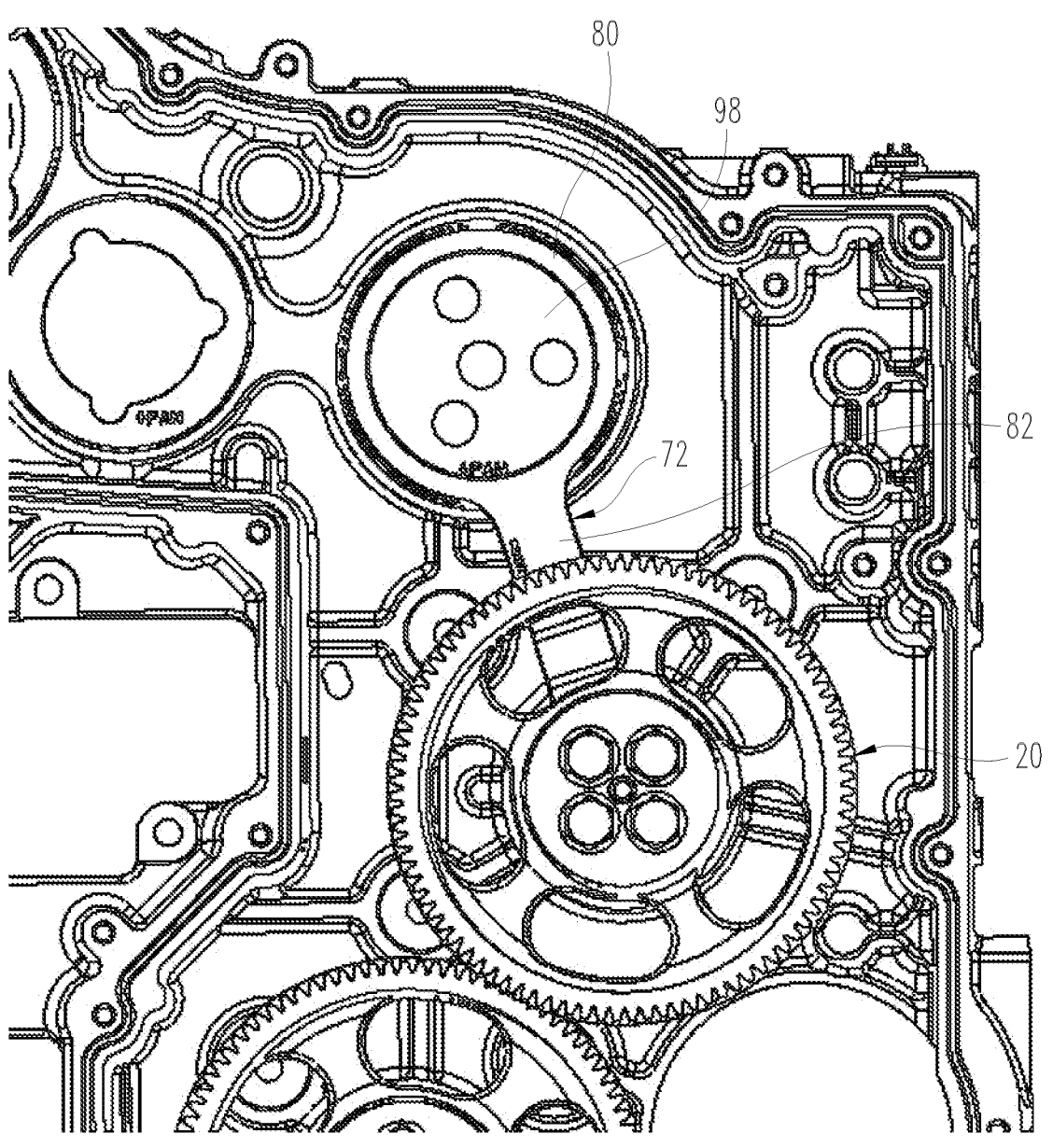
FIGS. 5A-5C show various steps in a geartrain assembly procedure.
Figure 5B:
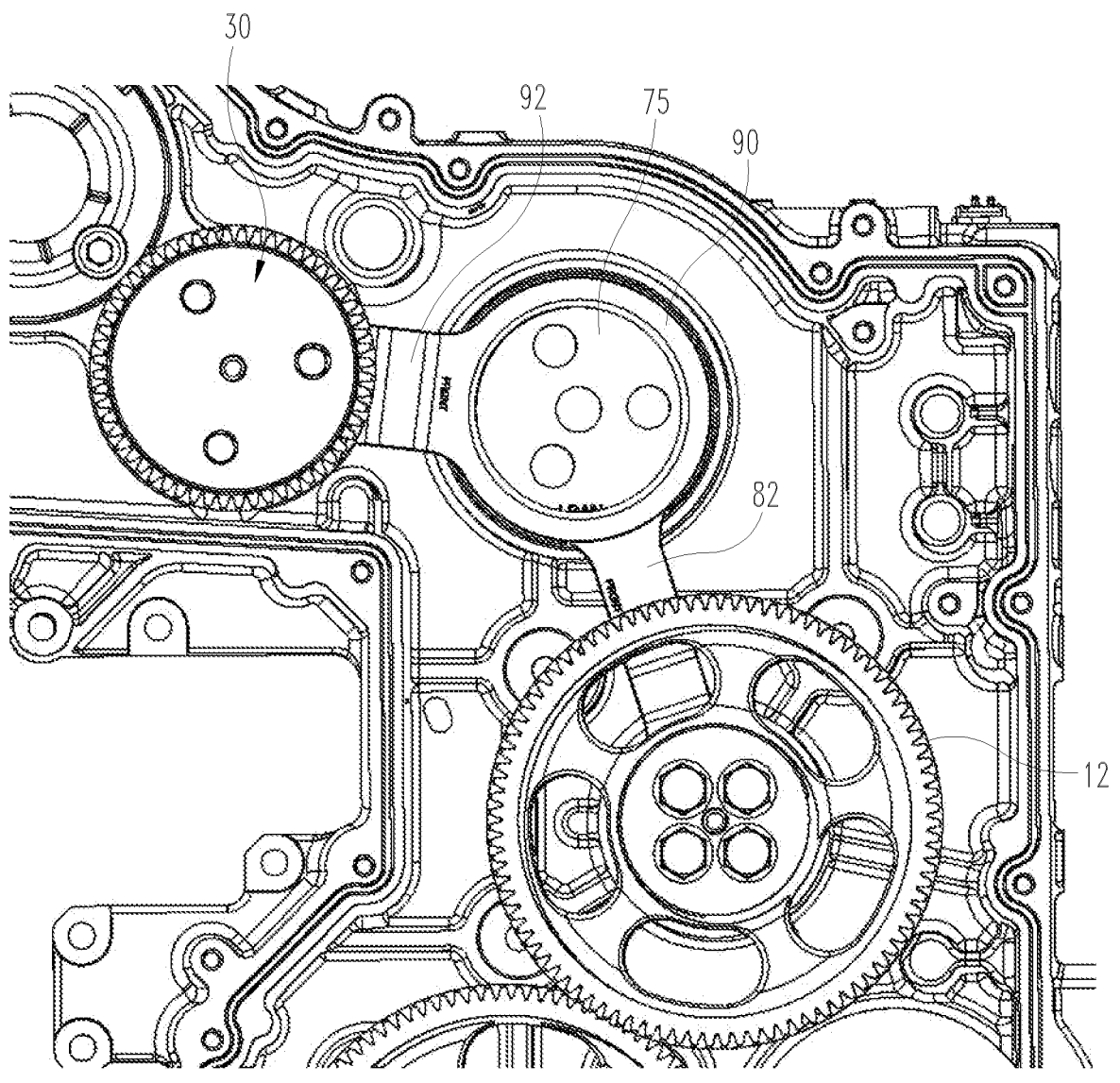
Figure 5C:
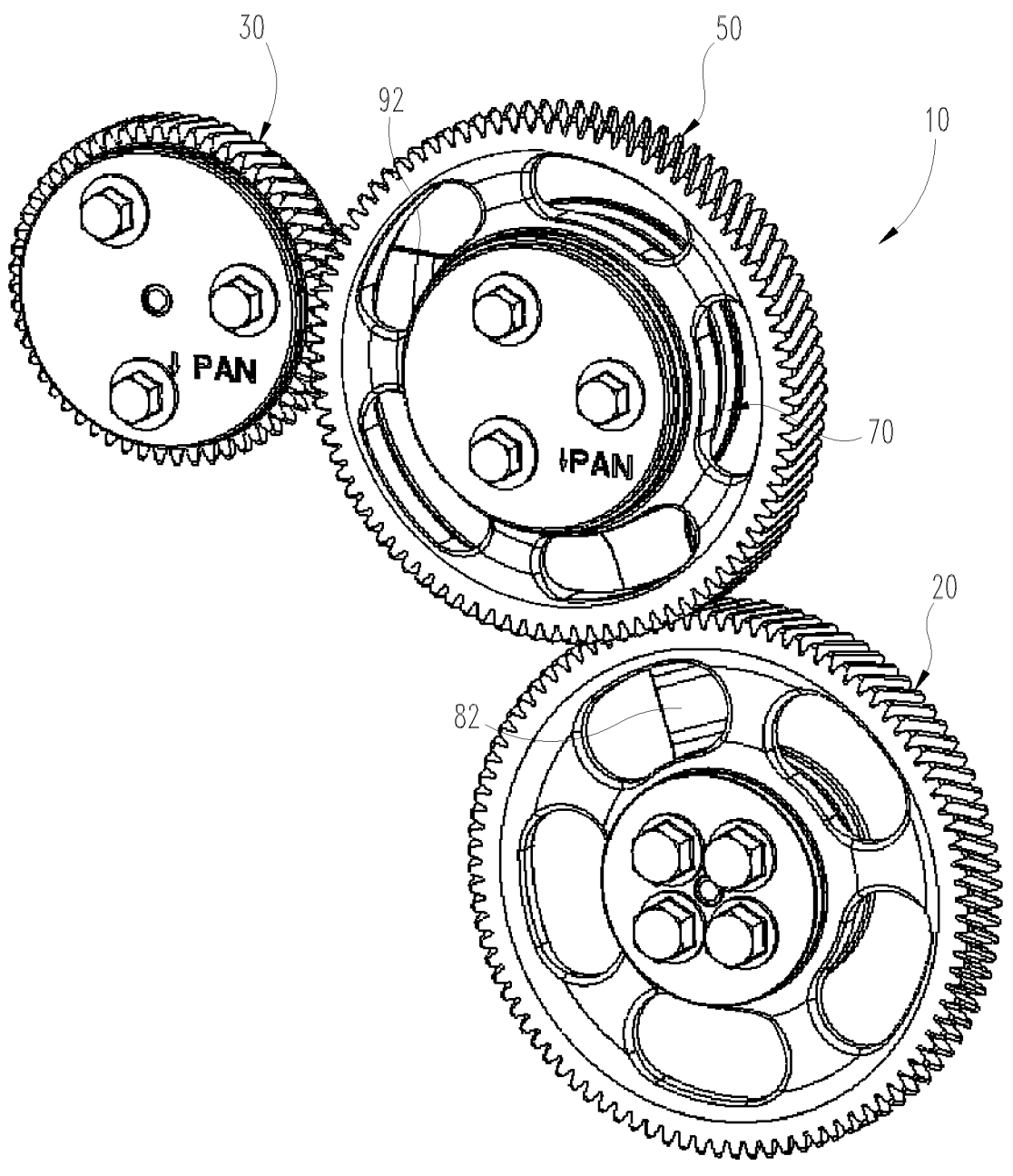

FIGS. 5A-5C show one embodiment of a mounting procedure for geartrain assembly 10. In FIG. 5A, first gear 20 is mounted to block 14 at a fixed location, such as by using a dowel 29 (FIG. 2) or other position control feature, in the X-Y coordinate plane. The position of the dowel 29 can be well controlled in the casting of the block 14. The journal 21 locates the gear wheel 22 on idler shaft 26. In addition, the outside diameter of idler shaft 26 has the first circular flange 76 of first link member 72 mounted thereon as it is being installed. The first link arm 82 extends outwardly from first gear 20 to first locating member 80 at the end thereof. First locating member 80 is positioned generally in a mounting area 98 for the third gear 50.

In FIG. 5B, second gear 30 is mounted to head 16 at a fixed location, such as by using a dowel 39 (FIG. 2) or other position control feature, in the X-Y coordinate plane. The journal 31 locates the gear wheel 32 on idler shaft 36. In addition, the outside diameter of idler shaft 36 has the second circular flange 78 of second link member 74 positioned thereon during mounting. The second link arm 92 extends outwardly from second gear 30 to second locating member 90 at the end thereof. Second locating member 90 is positioned in mounting area 98 for the third gear 50 so that leg 96 is interlocked within the ring-shaped plate of first locating member 80. The inner diameter of leg 96 defines a passage at the mounting location 75 on head 16 for insertion of the idler shaft 56 of the third gear 50.

In FIG. 5C the third gear 50 is then installed at the mounting location by piloting the idler shaft 56 into the passage through leg 96 at the mounting location 75 defined by the interlocked locating members 80, 90 in the mounting area 98. As shown in FIG. 3, the outer diameter of idler shaft 56 is guided into mounting location 75 by the passage defined by the pilot diameter formed by leg 96. The idler shaft 56 and retainer 53 can have oversized holes for receiving fasteners 55 to allow for final alignment of the third gear 50 relative to the tapped holes in head 16 for fasteners 55. Load distribution plate 60 is used to evenly distribute the load from the caps of the fasteners 55 and the clamped components.

As is evident from the figures and text presented above, a variety of aspects of the present disclosure are contemplated, examples of which are provided in the claims appended hereto and the descriptions above.

According to one aspect of the present disclosure, a geartrain assembly includes a first gear, a second gear, and a third gear positionable between the first gear and the second gear. The geartrain assembly includes a linkage connecting the first gear and the second gear that defines a mounting location of the third gear to connect the third gear to the first gear and to the second gear.

In an embodiment, the linkage includes a first link member connected to the first gear and a second link member connected to the second gear. The first and second link members each extend from the respective one of the first gear and the second gear to corresponding free ends of the first and second link members. The free ends engage one another to define the mounting location for the third gear.

In a refinement of the embodiment, the first link member includes a first circular flange at one end thereof that is positioned around an idler shaft of the first gear. The second link member includes a second circular flange at one end thereof that is positioned around an idler shaft of the second gear.

In a refinement of the embodiment, the first link member includes a first locating member at the other end thereof opposite the first circular flange, the second link member includes a second locating member at the other end thereof opposite the second circular flange, and the first and second locating members are interlocked with one another to define the mounting location for the third gear.

In a refinement of the embodiment, each of the first and second locating members includes a ring-shaped plate, and one of the first and second locating members includes a lip projecting outwardly from the ring-shaped plate thereof that is captured in the ring-shaped plate of the other of the first and second locating members.

In an embodiment, the third gear includes an idler shaft including at least one hole for receiving a fastener, a retainer engaged to the idler shaft to retain the third gear on the idler shaft with the retainer including at least one hole for receiving the fastener, and a load plate engaged to the retainer with the fastener. The at least one hole in each of the idler shaft and the retainer are over-sized relative to the fastener to allow for alignment of the third gear with respect to the mounting location.

In a refinement of the embodiment, the third gear includes a first thrust bearing between the retainer and a first face of a gear wheel of the third gear, and a second thrust bearing between a radially extending lip of the idler shaft and a second face of the gear wheel of the third gear that is opposite the first face.

In a refinement of the embodiment, the third gear includes a bushing around the idler shaft. In a refinement of the embodiment, the idler shaft includes a radially extending lip around its circumference that is positioned against the linkage at the mounting location.

In an embodiment, each of the first gear and second gear includes an idler shaft including at least one hole for receiving a fastener, a retainer engaged to the idler shaft to retain the corresponding one of the first gear and the second gear on the idler shaft with the retainer including at least one hole for receiving the fastener, and a bushing around the idler shaft about which the corresponding one of the first gear and the second gear rotates. In a refinement of the embodiment, the idler shaft includes a radially extending lip around its circumference and the linkage is positioned between the radially extending lip and a rearward face of a gear wheel of the corresponding one of the first gear and the second gear.

According to another aspect, a method for assembling a geartrain includes mounting a first gear with the first gear including a first link member extending therefrom, mounting a second gear with the second gear including a second link member extending therefrom that engages the first link member at a mounting location, and mounting a third gear at the mounting location defined by the engagement of the first link member to the second link member.

In an embodiment, in the first gear is mounted to a block of an engine and the second gear and the third gear are mounted to a head of an engine. In an embodiment, mounting the third gear includes installing a load distribution plate on an idler shaft of the third gear. In an embodiment, the first link member and the second link member are mounted around an idler shaft of the corresponding one of the first gear and the second gear before the first gear and the second gear are mounted.

In an embodiment, the first link member includes a first circular flange at one end thereof that is positioned around an idler shaft of the first gear, and the second link member includes a second circular flange at one end thereof that is positioned around an idler shaft of the second gear.

In a refinement of the embodiment, the first link member includes a first locating member at the other end thereof opposite the first circular flange, the second link member includes a second locating member at the other end thereof opposite the second circular flange, and the first and second locating members are interlocked with one another to define the mounting location. In another refinement, each of the first and second locating members includes a ring-shaped plate, and one of the first and second locating members includes a lip projecting outwardly from the ring-shaped plate thereof to capture the ring-shaped plate of the other of the first and second locating members.

In an embodiment, free ends of the first and second link members interlock with one another at the mounting location. In a refinement of this embodiment, an idler shaft of the third gear is received within a passage defined by the interlocked free ends of the first and second link members at the mounting location.

In the above description, certain relative terms may be used such as "up," "down," "upper," "lower," "horizontal," "vertical," "left," "right," "proximal," "distal," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventors to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A geartrain assembly, comprising:
a first gear;
a second gear;
a third gear positionable between the first gear and the second gear; and
a linkage including a first link member connected to the first gear and a second link member connected to the second gear, the first link member and the second link member each including at least one free end that engage one another to define a mounting location of the third gear to connect the third gear to the first gear and to the second gear, wherein:
the first link member includes a first circular flange at one end thereof that is positioned around an idler shaft of the first gear, the first link member including a first locating member at the other end thereof opposite the first circular flange;
the second link member includes a second circular flange at one end thereof that is positioned around an idler shaft of the second gear, the second link member includes a second locating member at the other end thereof opposite the second circular flange;
the first and second locating members are interlocked with one another to define the mounting location for the third gear; and
each of the first and second locating members includes a ring-shaped plate, and one of the first and second locating members includes a lip projecting outwardly from the ring-shaped plate thereof that is captured in the ring-shaped plate of the other of the first and second locating members.

2. A geartrain assembly, comprising:
a first gear;
a second gear;
a third gear positionable between the first gear and the second gear; and
a linkage connecting the first gear and the second gear that defines a mounting location of the third gear to connect the third gear to the first gear and to the second gear, wherein the third gear includes:
an idler shaft including at least one hole for receiving a fastener;
a retainer engaged to the idler shaft to retain the third gear on the idler shaft, the retainer including at least one hole for receiving the fastener; and
a load plate engaged to the retainer with the fastener, wherein the at least one hole in each of the idler shaft and the retainer are over-sized relative to the fastener to allow for alignment of the third gear with respect to the mounting location.

3. The geartrain assembly of claim 2, wherein the third gear includes:
a first thrust bearing between the retainer and a first face of a gear wheel of the third gear; and
a second thrust bearing between a radially extending lip of the idler shaft and a second face of the gear wheel of the third gear that is opposite the first face.

4. The geartrain assembly of claim 2, wherein the third gear includes a bushing around the idler shaft.

5. The geartrain assembly of claim 2, wherein the idler shaft includes a radially extending lip around its circumference that is positioned against the linkage at the mounting location.

6. The geartrain assembly of claim 2, wherein the linkage includes a first link member connected to the first gear and a second link member connected to the second gear, the first link member extending from the first gear and the second link member extending from second gear to corresponding free ends of the first and second link members, wherein the free ends engage one another to define the mounting location for the third gear.

7. The gear train assembly of claim 6, wherein:
the first link member includes a first circular flange at one end thereof that is positioned around an idler shaft of the first gear; and
the second link member includes a second circular flange at one end thereof that is positioned around an idler shaft of the second gear.

8. The geartrain assembly of claim 7, wherein:
the first link member includes a first locating member at the other end thereof opposite the first circular flange;
the second link member includes a second locating member at the other end thereof opposite the second circular flange; and
the first and second locating members are interlocked with one another to define the mounting location for the third gear.

9. The geartrain assembly of claim 8, wherein each of the first and second locating members includes a ring-shaped plate, and one of the first and second locating members includes a lip projecting outwardly from the ring-shaped plate thereof that is captured in the ring-shaped plate of the other of the first and second locating members.

10. A geartrain assembly, comprising:
a first gear;
a second gear;
a third gear positionable between the first gear and the second gear; and
a linkage connecting the first gear and the second gear that defines a mounting location of the third gear to connect the third gear to the first gear and to the second gear, wherein each of the first gear and second gear includes:
an idler shaft including at least one hole for receiving a fastener;
a retainer engaged to the idler shaft to retain the corresponding one of the first gear and the second gear on the idler shaft, the retainer including at least one hole for receiving the fastener; and
a bushing around the idler shaft about which the corresponding one of the first gear and the second gear rotates.

11. The geartrain assembly of claim 10, wherein the idler shaft includes a radially extending lip around its circumference and the linkage is positioned between the radially extending lip and a rearward face of a gear wheel of the corresponding one of the first gear and the second gear.

12. The geartrain assembly of claim 10, wherein the linkage includes a first link member connected to the first gear and a second link member connected to the second gear, the first link member extending from the first gear and the second link member extending from second gear to corresponding free ends of the first and second link members, wherein the free ends engage one another to define the mounting location for the third gear.

13. The gear train assembly of claim 12, wherein:

the first link member includes a first circular flange at one end thereof that is positioned around an idler shaft of the first gear; and the second link member includes a second circular flange at one end thereof that is positioned around an idler shaft of the second gear.

14. The geartrain assembly of claim 13, wherein:

the first link member includes a first locating member at the other end thereof opposite the first circular flange;

the second link member includes a second locating member at the other end thereof opposite the second circular flange; and the first and second locating members are interlocked with one another to define the mounting location for the third gear.

15. The geartrain assembly of claim 14, wherein each of the first and second locating members includes a ring-shaped plate, and one of the first and second locating members includes a lip projecting outwardly from the ring-shaped plate thereof that is captured in the ring-shaped plate of the other of the first and second locating members.

\* \* \* \* \*